United States Patent [19]
Abe et al.

[11] Patent Number: 5,513,043
[45] Date of Patent: Apr. 30, 1996

[54] REAL IMAGE TYPE VARIABLE POWER FINDER

[75] Inventors: Tetsuya Abe, Hokkaido; Sachio Hasushita; Takayuki Ito, both of Tokyo, all of Japan

[73] Assignee: Asahi Kogaku Kogyo Kaisha, Tokyo, Japan

[21] Appl. No.: 383,380

[22] Filed: Feb. 3, 1995

[30] Foreign Application Priority Data

Feb. 4, 1994 [JP] Japan ................................. 6-012977

[51] Int. Cl.$^6$ ............................. G02B 15/14; G02B 23/00
[52] U.S. Cl. ........................ 359/691; 359/422; 359/432; 359/676
[58] Field of Search ........................... 359/362, 421–422, 359/432–435, 676, 683, 691, 686, 689; 354/152, 199, 219–225

[56] References Cited

U.S. PATENT DOCUMENTS

| | | | |
|---|---|---|---|
| 4,018,511 | 4/1977 | Takahashi | 359/751 |
| 4,240,700 | 12/1980 | Ogawa et al. | 359/677 |
| 5,052,787 | 10/1991 | Sugawara | 359/683 |
| 5,086,353 | 2/1992 | Mulcai et al. | 359/422 |
| 5,231,534 | 7/1993 | Kato | 359/432 |
| 5,235,460 | 8/1993 | Abe | 359/431 |
| 5,309,286 | 5/1994 | Abe et al. | 359/695 |
| 5,323,264 | 6/1994 | Kato | 359/432 |

FOREIGN PATENT DOCUMENTS

| | | | |
|---|---|---|---|
| 51108 | 2/1992 | Japan | 359/432 |
| 2260202 | 4/1993 | United Kingdom . | |
| 2261744 | 5/1993 | United Kingdom . | |

*Primary Examiner*—Thong Q. Nguyen
*Attorney, Agent, or Firm*—Greenblum & Bernstein

[57] ABSTRACT

A real image type variable power finder includes an objective lens system, an ocular lens system, a condenser lens, and an image erecting optical system. The objective lens system includes a first lens group having a negative power and a second lens group having a positive power in this order from the object side, so that the two lens groups being removed to vary the magnification. The second lens group has a negative lens and a positive lens in this order from the object side. The variable power finder satisfies the relationships:

(1) $2.5 < f_E/f_S < 4.0$;

(2) $-0.7 < f_S/f_1 < -0.3$ ($f_1 < 0$);

(3) $0.4 < f_S/f_2 < 0.8$;

and (4) $-0.3 < f_S/f_{2-1} < -0.05$ ($f_{2-1} < 0$);

wherein "$f_E$" designates the focal length of the ocular optical system, "$f_S$" the effective focal length of a lens system including the objective lens system and the condenser lens on the short focal length side, "$f_1$" the focal length of the first lens group of the objective lens system, "$f_2$" the focal length of the second lens group of the objective lens system, and "$f_{2-1}$" the focal length of the negative lens of the second lens group of the objective lens system, respectively.

8 Claims, 8 Drawing Sheets

REAL IMAGE TYPE VARIABLE POWER FINDER

BACKGROUND OF THE INVENTION

1. Field of the Invention

The present invention relates to a real image type variable power finder which can be used for a compact camera or the like. More precisely, the present invention relates to a small size real image type variable finder having a wide angle of view and an increased zoom ratio.

2. Description of Related Art

In a conventional real image type variable finder for a compact camera, in general, the half angle of view of an objective lens system thereof at the wide angle extremity is less than 30°, and the zoom ratio is small, i.e., approximately 2. In an attempt to increase both the angle of view and the zoom ratio (magnifying power) in the conventional objective lens system, it is necessary to solve the problem such that distortion and chromatic aberration are inevitably increased thereby. The distortion and the chromatic aberration can be eliminated by increasing the diameter of the front lens of the objective lens system or the whole length thereof, which is however contrary to miniaturization of the entire objective lens system. Hitherto, there has been no small real image type variable power finder having an objective lens system whose half angle of view and zoom ratio are more than 30° and approximately 3, respectively.

SUMMARY OF THE INVENTION

The primary object of the present invention is to provide a small real image type variable power finder in which the half angle of view at a wide-angle extremity is greater than 30° and the zoom ratio is approximately 3, by improving the lens arrangement of the objective lens system of the finder.

To achieve the object mentioned above, according to an aspect of the present invention, there is provided a real image type variable power finder comprising an objective lens system, a condenser lens, and an ocular lens system, arranged in this order from the object side. The condenser lens is adapted to make an object image formed by the objective lens system incident upon the ocular lens system.

A provision is further made for an image erecting optical system.

The objective lens system is comprised of a first lens group having a negative power and a second lens group having a positive power in this order from the object side, such that the first and second lens groups can move to vary the magnification.

The second lens group is comprised of a negative lens and a positive lens in this order from the object side.

The variable power finder meets the requirements defined by the following formulae (1) through (4);

(1) $2.5 < f_E/f_S < 4.0$ (2) $-0.7 < f_S/f_1 < -0.3$ ($f_1 < 0$)

(3) $0.4 < f_S/f_2 < 0.8$ (4) $-0.3 < f_S/f_{2-1} < -0.05$ ($f_{2-1} < 0$)

wherein $f_E$: focal length of the ocular optical system;

$f_S$: effective or resultant focal length of a lens system from the objective lens system to the condenser lens on the wide-angle extremity;

$f_1$: focal length of the first lens group of the objective lens system;

$f_2$: focal length of the second lens group of the objective lens system;

$f_{2-1}$: focal length of the negative lens of the second lens group belonging to the objective lens system.

The first lens group of the objective lens system can be made of a single negative double-concave aspherical lens which satisfies the following relationships:

(5) $0.005 < (\Delta X_1 \Delta X_2)/f_S$ (6) $0.3 < f_S/r_{1-2} < 0.9$ (7) $-0.65 < r_{1-2}/r_{1-1} < -0.15$ ($r_{1-1} < 0$)

wherein $\Delta X_1$: amount of aspherical deviation of the first surface (a surface of the object side) of the double-concave lens at the maximum effective diameter thereof;

$\Delta X_2$: amount of aspherical deviation of the second surface (a surface of the image side) of the double-concave lens at the maximum effective diameter thereof;

$r_{1-1}$: paraxial radius of curvature of the first surface of the double-concave lens;

$r_{1-2}$: paraxial radius of curvature of the second surface of the double-concave lens;

Preferably, the second lens group of the objective lens system satisfies the following relationship;

(8) $15 < \nu_{2P} - \nu_{2N}$ wherein $\nu_{2P}$: Abbe number of the d-line of the positive lens of the second lens group;

$\nu_{2N}$: Abbe number of the d-line of the negative lens of the second lens group.

In order to effectively correct the curvature of the field, it is preferable that a field curvature correcting lens having a positive focal length be provided between the objective lens system and the condenser lens. If the field curvature correcting lens is provided with at least one aspherical surface, the curvature of the field can be more effectively corrected.

Preferably, one of the four reflecting surfaces of the image erecting optical system is located between the objective lens system and the condenser lens to achieve a small variable power finder.

Similarly, one of the four reflecting surfaces of the image erecting optical system is preferably located between the objective lens system and the field curvature correcting lens, when the field curvature correcting lens is provided between the objective lens system and the condenser lens.

BRIEF DESCRIPTION OF THE DRAWINGS

The invention will be described below in detail with reference to the accompanying drawings, in which.

DESCRIPTION OF THE PREFERRED EMBODIMENT

Figure 1:
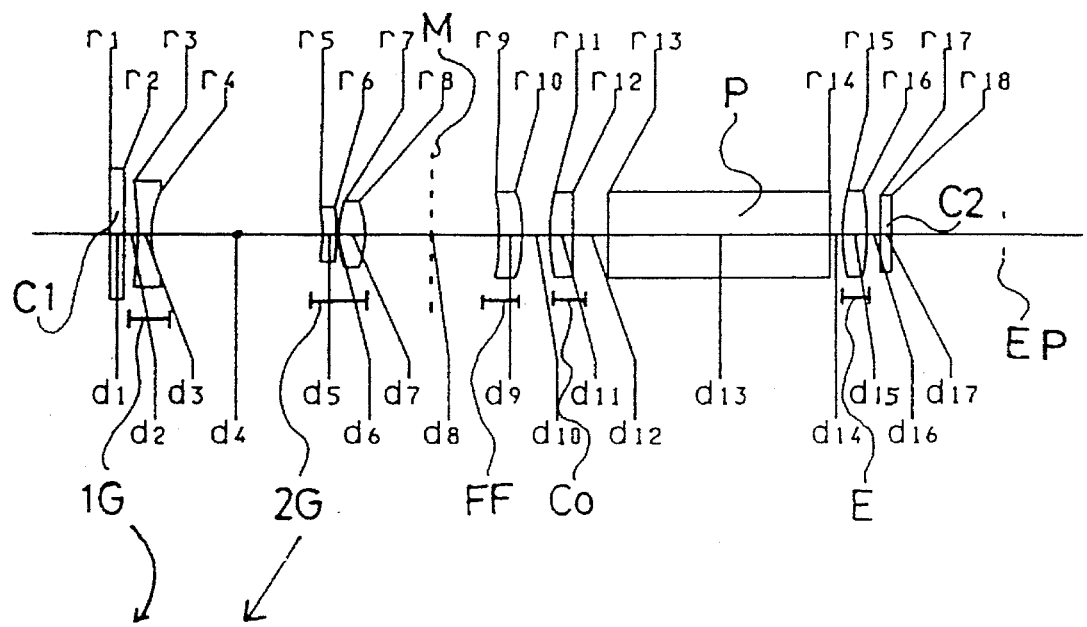
FIG. 1 is a schematic view of a lens arrangement of a real image type variable power finder at a wide-angle extremity, according to a first embodiment of the present invention.

To increase the angle of view of an objective lens system in a real image type variable power finder, a retrofocus type zoom lens system having a negative lens group and a positive lens group in this order from the object side, is preferably utilized as the objective lens system. Moreover, the second lens group of the objective lens system having a positive power consists preferably of a negative lens and a positive lens in this order from the object side. This provides a small real image type variable power finder having a half angle of view greater than 30° at a wide-angle extremity and a zoom ratio of around 3, while ensuring a correction of the distortion and the chromatic aberration without increasing the diameter of the front lens.

With this arrangement, even if the first lens group having a negative power is made of a single lens, the distortion can be easily corrected. Hence, the diameter of the front lens can be reduced. Moreover, since the second lens group is made of two lenses, the achromatization can be carried out in spite of an increase in power. Thus, an achromatic small lens system having an increased zoom ratio can be obtained.

Formula (1) specifies the power ratio of the objective lens system to the ocular lens system (eyepiece). To increase the angle of view, it is necessary to increase the power of the objective lens system (i.e., reduce the focal length thereof). If the power ratio is below the lower limit of formula (1), then the focal length of the objective lens system is so large that the front lens diameter is too large in view of the half angle of view more than 30°. Consequently, miniaturization of the finder cannot be achieved.

Conversely, if the power ratio is above the upper limit, then the focal length of the objective lens system is reduced. As a result, the angular magnification ($\approx f_S/f_E$) is so small that an object image is too small to be viewed, which is unacceptable in a view finder.

Formulae (2) and (3) specify the power distribution between the first and second lens groups of the objective lens system. If the power distribution value is larger than the upper limit of formula (2) or smaller than the lower limit of formula (3), then the power of each lens groups is too small to obtain a zoom ratio greater than 3. To obtain a zoom ratio of more than 3, it is necessary to increase the distance between the first and second lens groups, thus resulting in an increase in the front lens diameter and the whole lens length.

Further, even though a power distribution valve smaller than the lower limit of formula (2) or larger than the upper limit of formula (3) is advantageous with respect to miniaturization of the lens system, aberration correction cannot be effectively carried out.

Formula (4) relates to a lens arrangement of the second lens group of the objective lens system according to one of the most significant features of the present invention. As mentioned above, a second lens group having a power large enough to meet the requirement defined in formula (3) is made of two lenses, consisting of positive and negative lenses, so as to function as an achromatizing lens. Preferably, the negative lens is disposed closer to the object than the positive lens to correct the distortion. With this lens arrangement, any fluctuation of distortion caused by the objective lens system from the wide-angle extremity to the telephoto extremity can be attenuated.

If the ratio exceeds the upper limit of formula (4), then the power of the negative lens of the second lens group adjacent to the object side is too small to correct the distortion. In addition, the chromatic aberration changes considerably during the power varying operation. Conversely, if the ratio is below the lower limit of formula (4), the power is so large that over-corrected spherical aberration and comatic aberration occurs. Moreover, high-order aberrations can be caused.

Formula (5) relates to the first lens group of the objective lens system having a negative power. The first lens group is preferably made of one negative lens to reduce the front lens diameter. To correct aberrations by one lens, both surfaces of the lens are preferably aspherical. To correct the distortion, each of the aspherical surfaces is preferably such that the negative surface power at the peripheral portion thereof is smaller than that determined by the paraxial spherical surface, (provided that the lens meets the requirement of formula (5)).

In order to obtain a negative lens having a large negative power as defined in formula (2), the opposed surfaces thereof are preferably concave surfaces (double-concave lens) that meet the requirements defined in formulae (6) and (7).

If the value of formula (6) or (7) exceeds the upper limit, then the curvature of the second concave surface is so large (i.e., radius of curvature is small) that an over-corrected spherical aberration on the telephoto extremity takes place and high-order aberrations occur. Conversely, if the value is smaller than the lower limit, then it is necessary to increase the curvature of the first concave surface so as to meet the requirement defined in formula (2), which specifies the negative power of the first lens group. Consequently, distortion cannot be effectively corrected.

Formula (8) specifies the requirement for achromatization of the second lens group. The second lens group is preferably made of a positive and a negative lense in combination, and have an Abbe number difference more than the lower limit defined in the formula (8). This results in a lens system having a large zoom ratio similar to the present invention.

In a real image type variable power finder according to the present invention, it is possible to provide a field curvature correcting lens having a positive focal length between the objective lens system and the condenser lens to effectively correct the curvature of field. The field curvature correcting lens also functions as a condenser lens to make light incident upon the ocular optical system. Moreover, if the field curvature correcting lens is provided with at least one aspherical surface, the curvature of field, as well as any astigmatism, can be easily corrected.

A real image type variable power finder according to the present invention can be provided with an image erecting optical system to erect an object image formed by the objective lens system. The image erecting optical system is provided with four reflecting surfaces to invert (and reverse) the object image in the vertical and horizontal directions. To reduce the size of the image erecting optical system, according to the present invention, one of the four reflecting surfaces is disposed between the objective lens system and the condenser lens. If the field curvature correcting lens is present, the reflecting surface is disposed between the objective lens system and the field curvature correcting lens. In general, the focal length of the ocular optical system is longer than the focal length of the objective lens system. Accordingly, in the arrangement in which one of the reflecting surfaces is located between the objective lens system and the condenser lens (if the field curvature correcting lens is present, the reflecting surface is disposed between the objective lens system and the field curvature correcting lens), the whole length of the view finder can be reduced while maintaining a good optical balance. Namely, it is necessary to increase the focal length of the ocular optical system such that four reflections of light take place in the rear of an image forming position in which the object image is formed by the objective lens system. However, this decreases unacceptably the angular magnification. The occurrence of one reflection in front of the image forming position of the objective lens system, as in the present invention, contributes to an increase in the angular magnification. To this end, in the preferred embodiment of the present invention, one of the reflection surfaces is located either between the objective lens system and the condenser lens, or between the objective lens system and the field curvature correcting lens (if any). Note that in order to provide a reflecting optical system between the objective lens system and the condenser lens, it is necessary to increase the back focal distance of the objective lens system at the wide-angle extremity in comparison with the focal length thereof. To this end, and to achieve an effective correction of the distortion at the wide-angle extremity, the objective lens system is preferably of a retro-focus type that includes a first lens group having a negative power and a second lens group having a positive power in this order from the object side. Also, the second lens group is preferably comprised of a negative lens and a positive lens in this order from the object side.

It is preferable that a real image forming position of the objective lens system is on or in the vicinity of the second surface (a surface of the image side) of the condenser lens.

Four examples of numerical data (first to fourth embodiments) will be discussed below. In the first and second embodiments, the finder is comprised of an objective lens system consisting of a first lens group 1G and a second lens group 2G, a field curvature correcting lens (field flattener) FF, a condenser lens CO, a prism P and an ocular optical system E in this order from the object side. In the third and fourth embodiments, there is no field curvature correcting lens. The three reflecting surfaces of the image erecting optical system are provided on the prism P. The other reflecting surface M (one reflecting surface) is provided between the objective lens system and the field curvature correcting lens FF (in the first and second embodiments), or between the objective lens system and the condenser lens CO (in the third and fourth embodiments).

In the four embodiments, there are front and rear glass covers $C_1$ and $C_2$, in the form of plane-parallel plates, on the object side and the eyepiece lens side, respectively. The front glass cover $C_1$ is provided with surfaces $r_1$ and $r_2$, and the rear glass cover $C_2$ is provided with surfaces $r_{17}$ and $r_{18}$ (in the first and second embodiments, and $r_{15}$ and $r_{16}$ in the third and fourth embodiments. The eye point is located at a distance of 12.0 mm from the second surface of the rear glass cover $C_2$. In the four embodiments, a real image by the objective lens system is formed on or in the vicinity of the second surface (a surface of the image side) of the condenser lens CO.

First Embodiment

Figure 2:
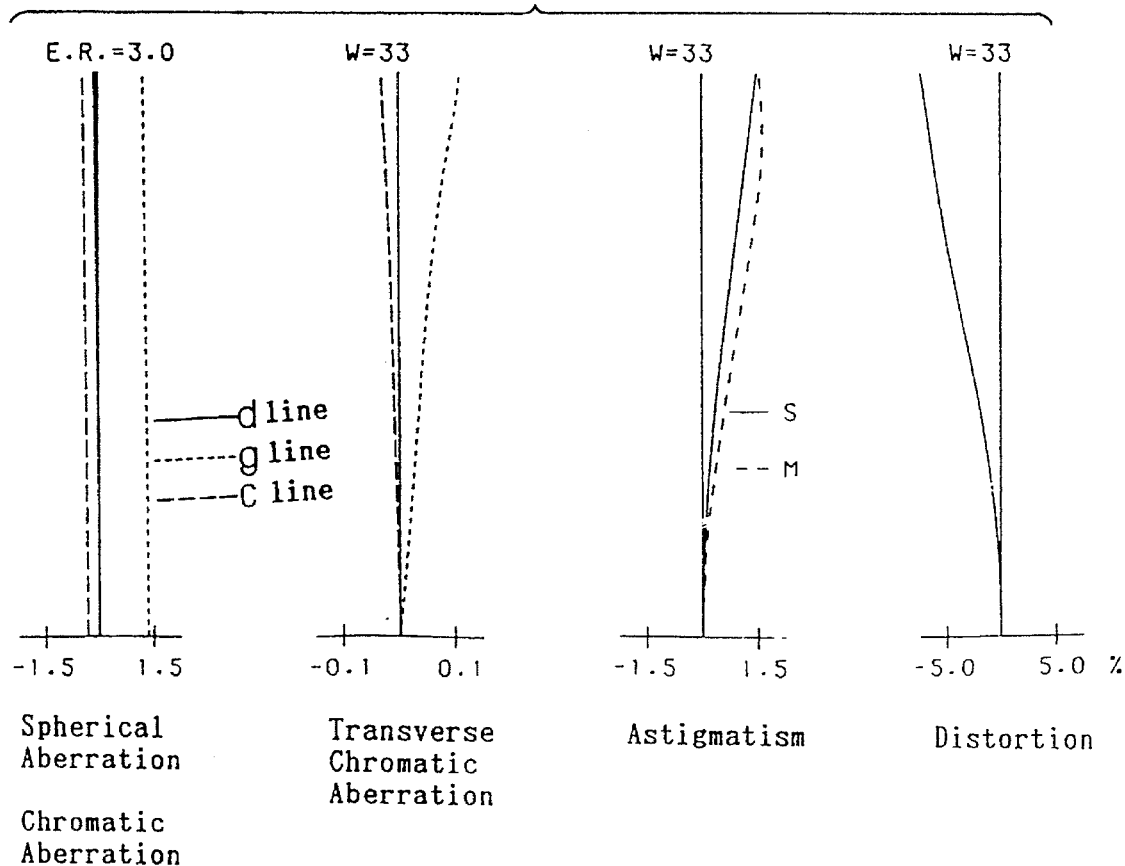
FIG. 2 shows various aberration diagrams of the lens system shown in FIG. 1.
Figure 3:
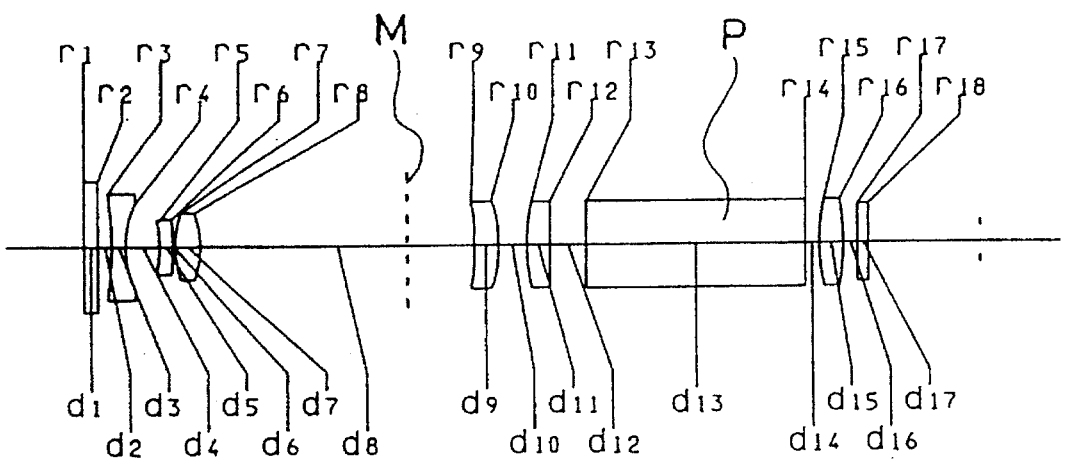
FIG. 3 is a schematic view of a lens arrangement of a real image type variable power finder at a telephoto extremity, according to the first embodiment of the present invention.
Figure 4:
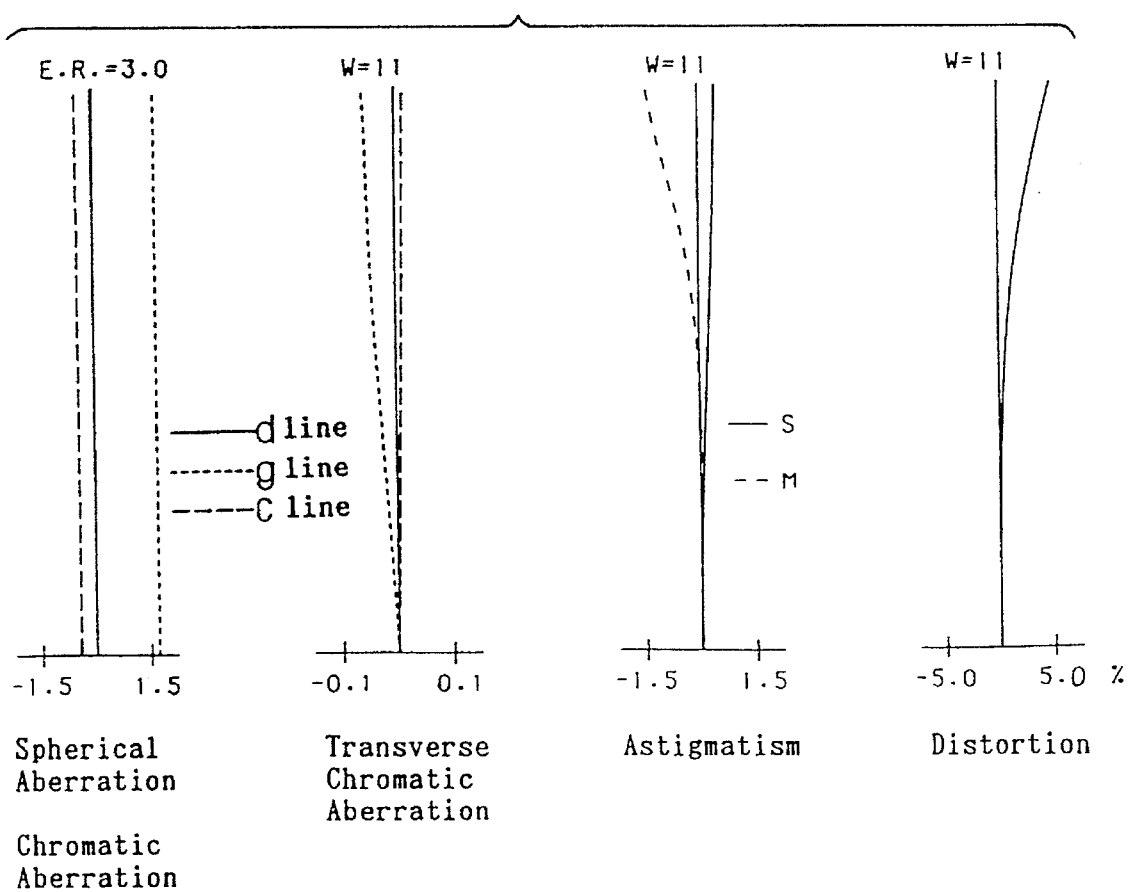
FIG. 4 shows various aberration diagrams of the lens system shown in FIG. 3.

FIGS. 1 through 4 show a first embodiment of a real image type variable power finder according to the present invention. FIGS. 1 and 2 show a lens arrangement and diagrams of various aberrations thereof, at a wide-angle extremity, respectively. FIGS. 3 and 4 show a lens arrangement and diagrams of various aberrations thereof, at a telephoto extremity, respectively.

Numerical data of the lens system in the first embodiment are shown in Table 1 below.

In FIGS. 2 and 4, "d-line", "g-line" and "C-line" designate the chromatic aberration represented by the spherical aberration and the transverse chromatic aberration, at the respective wavelengths, "S" the sagittal ray, and "M" the meridional ray, respectively.

In the Tables and the drawings, "W" designates the actual field of view (in degrees), "Dp" the diopter, "M" the magnification (angular magnification), "E.R." the eye ring diameter, "R" the radius of curvature of the lens, "D" the lens thickness or the distance between the lenses, "Nd" the refractive index at the d-line, and "νd" the Abbe number at the d-line, respectively.

The shape of the aspherical surface can be generally expressed as follows.

$$X = CY^2/\{1+[1-(1+K)C^2Y^2]^{1/2}\} + A_4Y^4 + A_6Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex (1/r),

K represents a conic constant, $A_4$ represents a fourth-order aspherical factor, $A_6$ represents a sixth-order aspherical factor, $A_8$ represents a eighth-order aspherical factor, $A_{10}$ represents a tenth-order aspherical factor.

TABLE 1

W = 33-19-11
Dp = −0.98
M = 0.33-0.55-0.94
E.R. = 3.0ϕ

| surface No. | R | D | $N^d$ | $ν^d$ |
|---|---|---|---|---|
| 1 | ∞ | 1.50 | 1.49176 | 57.4 |
| 2 | ∞ | 1.50-5.33-1.50 | — | — |
| 3* | −30.816 | 1.50 | 1.49176 | 57.4 |

TABLE 1-continued

W = 33-19-11
Dp = -0.98
M = 0.33-0.55-0.94
E.R. = 3.0φ

| surface No. | R | D | $N^d$ | $v^d$ |
|---|---|---|---|---|
| 4* | 9.130 | 18.30-9.03-3.60 | — | — |
| 5* | -13.205 | 1.40 | 1.58547 | 29.9 |
| 6 | -33.000 | 0.30 | — | — |
| 7 | 11.000 | 2.70 | 1.49176 | 57.4 |
| 8* | -9.000 | 14.10-19.54-28.80 | — | — |
| 9* | -322.322 | 2.50 | 1.49176 | 57.4 |
| 10* | -22.525 | 3.00 | — | — |
| 11 | 19.975 | 2.50 | 1.49176 | 57.4 |
| 12 | ∞ | 3.80 | — | — |
| 13 | ∞ | 23.50 | 1.49176 | 57.4 |
| 14 | ∞ | 1.50 | — | — |
| 15* | 19.071 | 2.60 | 1.49176 | 57.4 |
| 16 | -24.700 | 1.50 | — | — |
| 17 | ∞ | 1.20 | 1.49176 | 57.4 |
| 18 | ∞ | — | — | — |

*marked surface is aspherical.
NO. 3: K = 0.0, A4 = -0.50300 × $10^{-3}$, A6 = 0.39470 × $10^{-4}$, A8 = -0.89800 × $10^{-6}$, A10 = 0.75500 × $10^{-8}$, A12 = 0.0
NO. 4: K = 0.0, A4 = -0.10000 × $10^{-2}$, A6 = 0.56200 × $10^{-4}$, A8 = -0.75400 × $10^{-6}$, A10 = 0.0, A12 = 0.0
NO. 5: K = 0.0, A4 = -0.68000 × $10^{-3}$, A6 = 0.16260 × $10^{-4}$, A8 = 0.48400 × $10^{-6}$, A10 = 0.0, A12 = 0.0
NO. 8: K = 0.0, A4 = 0.92700 × $10^{-4}$, A6 = 0.16670 × $10^{-4}$, A8 = -0.83000 × $10^{-7}$, A10 = 0.0, A12 = 0.0
NO. 9: K = 0.0, A4 = -0.62800 × $10^{-3}$, A6 = -0.93800 × $10^{-5}$, A8 = -0.79720 × $10^{-6}$, A10 = 0.0, A12 = 0.0
NO. 10: K = 0.0, A4 = -0.63700 × $10^{-3}$, A6 = 0.53530 × $10^{-5}$, A8 = -0.52800 × $10^{-6}$, A10 = 0.0, A12 = 0.0
NO. 15: K = 0.0, A4 = -0.69030 × $10^{-4}$, A6 = 0.10810 × $10^{-6}$, A8 = 0.10250 × $10^{-8}$, A10 = 0.0, A12 = 0.0

Second Embodiment

Figure 5:
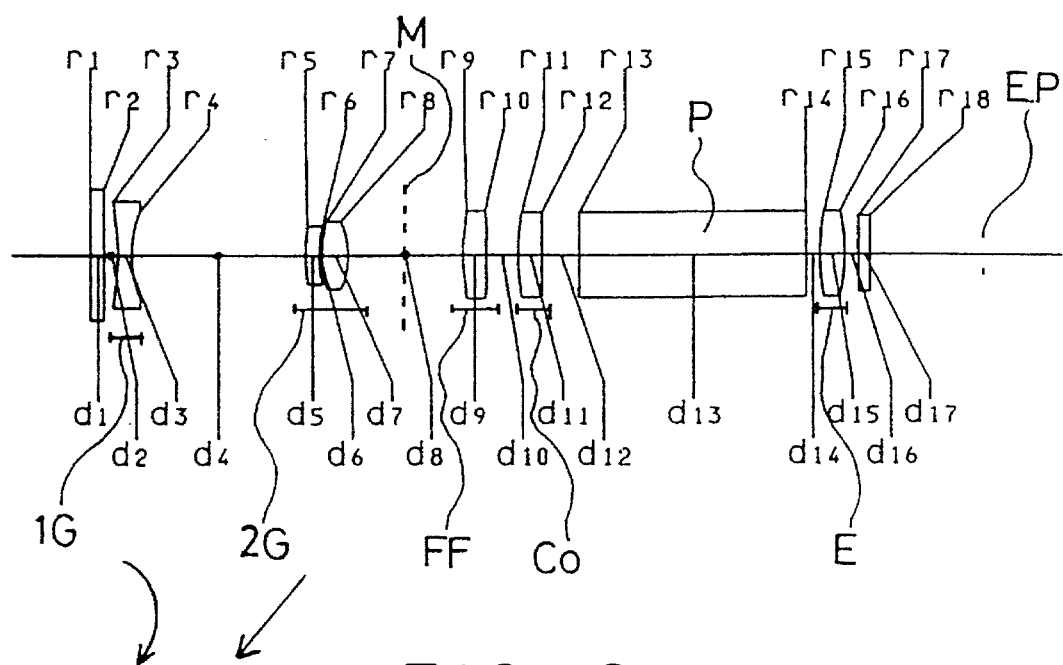
FIG. 5 is a schematic view of a lens arrangement of a real image type variable power finder at a wide-angle extremity, according to a second embodiment of the present invention.
Figure 6:
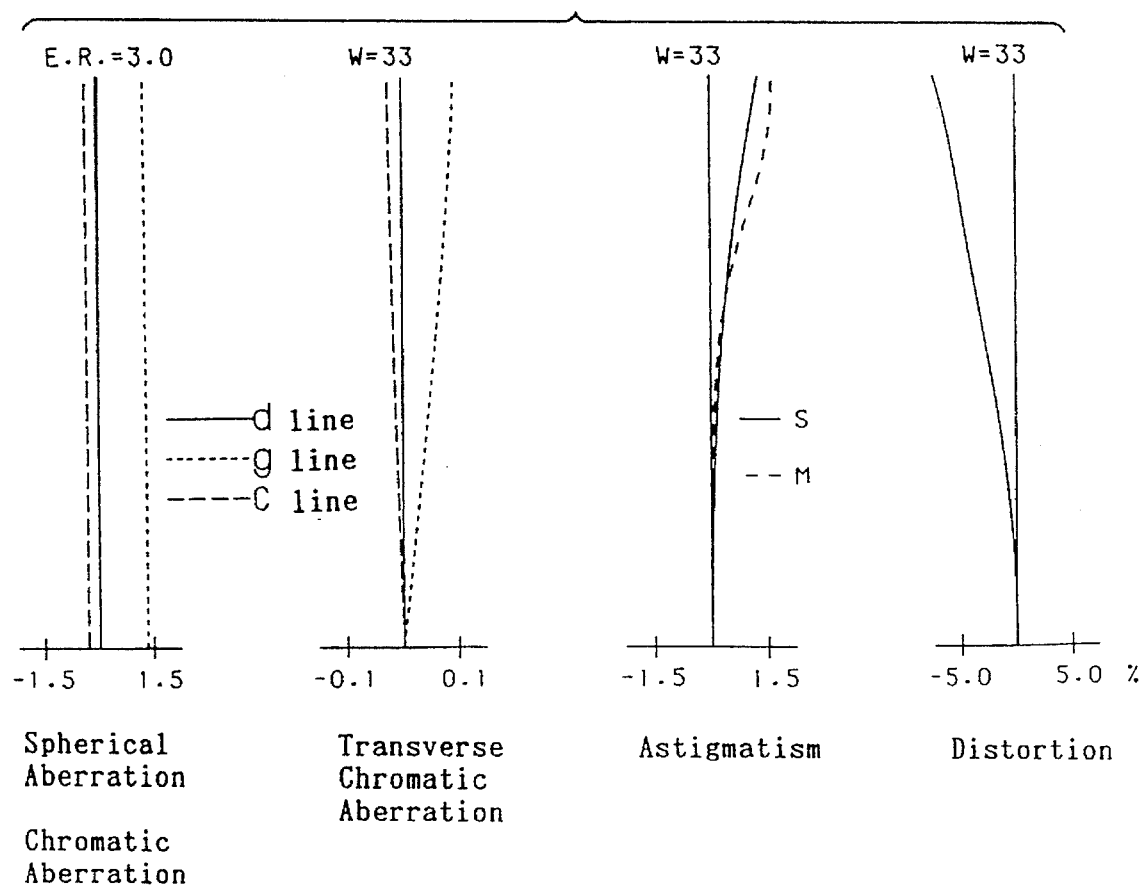
FIG. 6 shows various aberration diagrams of the lens system shown in FIG. 5.
Figure 7:
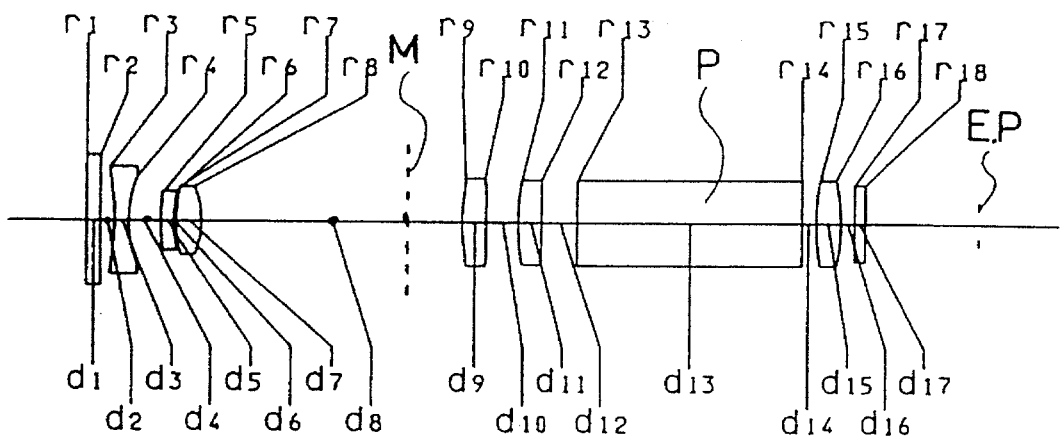
FIG. 7 is a schematic view of a lens arrangement of a real image type variable power finder at a telephoto extremity, according to the second embodiment of the present invention.
Figure 8:
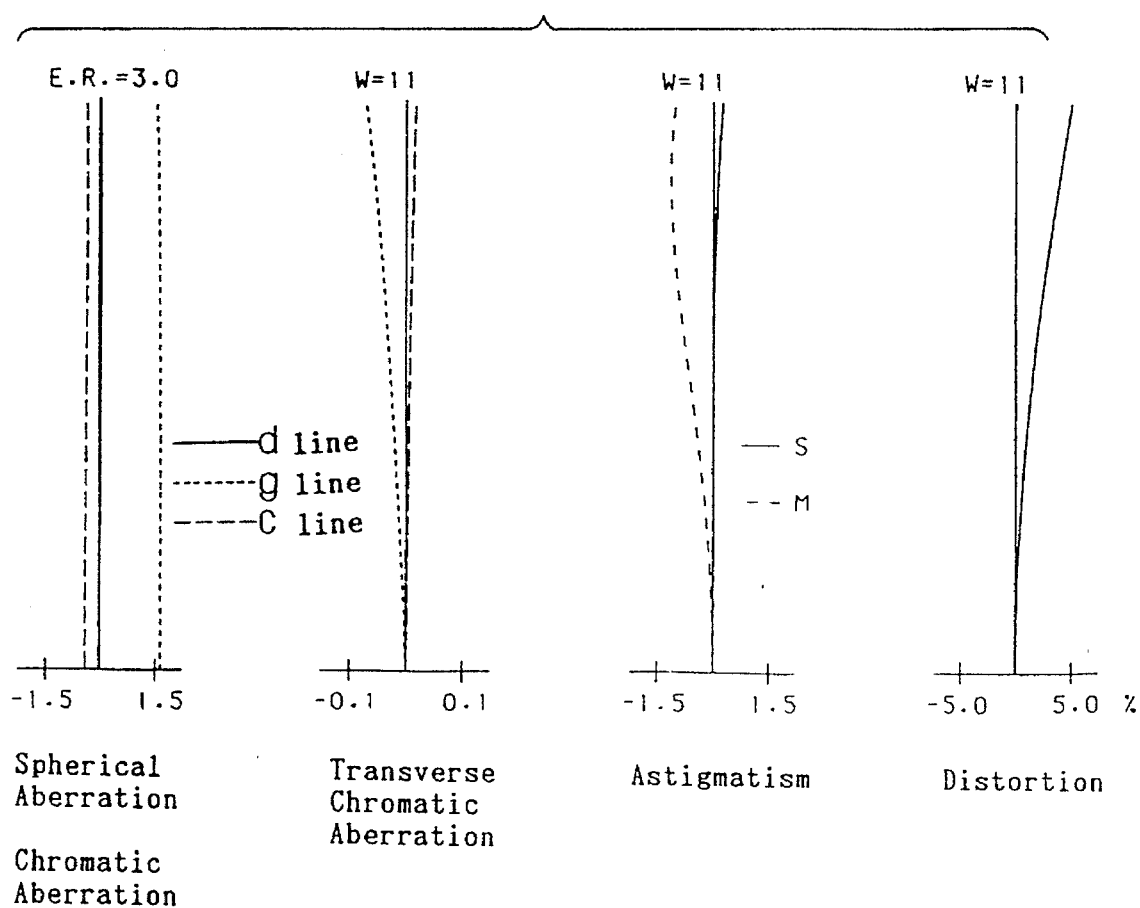
FIG. 8 shows various aberration diagrams of the lens system shown in FIG. 7.

FIGS. 5 through 8 show a second embodiment of a real image type variable power finder, according to the present invention. FIGS. 5 and 6 show a lens arrangement and diagrams of various aberrations thereof, at a wide-angle extremity, respectively. FIGS. 7 and 8 show a lens arrangement and diagrams of various aberrations thereof, at a telephoto extremity, respectively.

Numerical data of the lens system in the second embodiment are shown in Table 2 below.

TABLE 2

W = 33-19-11
Dp = -1.0
M = 0.32-0.54-0.92
E.R. = 3.0φ

| surface No. | R | D | $N^d$ | $v^d$ |
|---|---|---|---|---|
| 1 | ∞ | 1.50 | 1.49176 | 57.4 |
| 2 | ∞ | 1.50-5.39-1.50 | — | — |
| 3* | -20.660 | 1.50 | 1.49176 | 57.4 |
| 4* | 12.469 | 18.30-8.85-3.30 | — | — |
| 5* | 17.511 | 1.40 | 1.58547 | 29.9 |
| 6 | 12.931 | 0.30 | — | — |
| 7 | 14.164 | 2.70 | 1.49176 | 57.4 |
| 8* | -9.000 | 12.10-17.66-27.10 | — | — |
| 9* | 13.725 | 2.50 | 1.49176 | 57.4 |
| 10* | 48.374 | 3.28 | — | — |
| 11 | 25.013 | 2.50 | 1.49176 | 57.4 |
| 12 | ∞ | 3.80 | — | — |
| 13 | ∞ | 23.50 | 1.49176 | 57.4 |
| 14 | ∞ | 1.50 | — | — |
| 15* | 22.057 | 2.60 | 1.49176 | 57.4 |
| 16 | -21.262 | 1.50 | — | — |
| 17 | ∞ | 1.20 | 1.49176 | 57.4 |
| 18 | ∞ | — | — | — |

TABLE 2-continued

W = 33-19-11
Dp = -1.0
M = 0.32-0.54-0.92
E.R. = 3.0φ

| surface No. | R | D | $N^d$ | $v^d$ |
|---|---|---|---|---|

*marked surface is aspherical.
NO. 3: K = 0.0, A4 = -0.53976 × $10^{-4}$, A6 = 0.28869 × $10^{-4}$, A8 = -0.82091 × $10^{-6}$, A10 = 0.7506010$^{-8}$, A12 = 0.0
NO. 4: K = 0.0, A4 = -0.38315 × $10^{-3}$, A6 = 0.44426 × $10^{-4}$, A8 = -0.88920 × $10^{-6}$, A10 = 0.0, A12 = 0.0
NO. 5: K = 0.0, A4 = -0.66027 × $10^{-3}$, A6 = -0.56809 × $10^{-5}$, A8 = -0.39905 × $10^{-6}$, A10 = 0.0, A12 = 0.0
NO. 8: K = 0.0, A4 = -0.29777 × $10^{-3}$, A6 = -0.41843 × $10^{-5}$, A8 = -0.33657 × $10^{-6}$, A10 = 0.0, A12 = 0.0
NO. 9: K = 0.0, A4 = -0.73500 × $10^{-3}$, A6 = -0.67139 × $10^{-5}$, A8 = 0.0, A10 = 0.0, A12 = 0.0
NO. 10: K = 0.0, A4 = -0.68329 × $10^{-3}$, A6 = -0.38434 × $10^{-5}$, A8 = 0.0, A10 = 0.0, A12 = 0.0
NO. 15: K = 0.0, A4 = -0.68074 × $10^{-4}$, A6 = 0.29471 × $10^{-6}$, A8 = -0.19712 × $10^{-8}$, A10 = 0.0, A12 = 0.0

Third Embodiment

Figure 9:
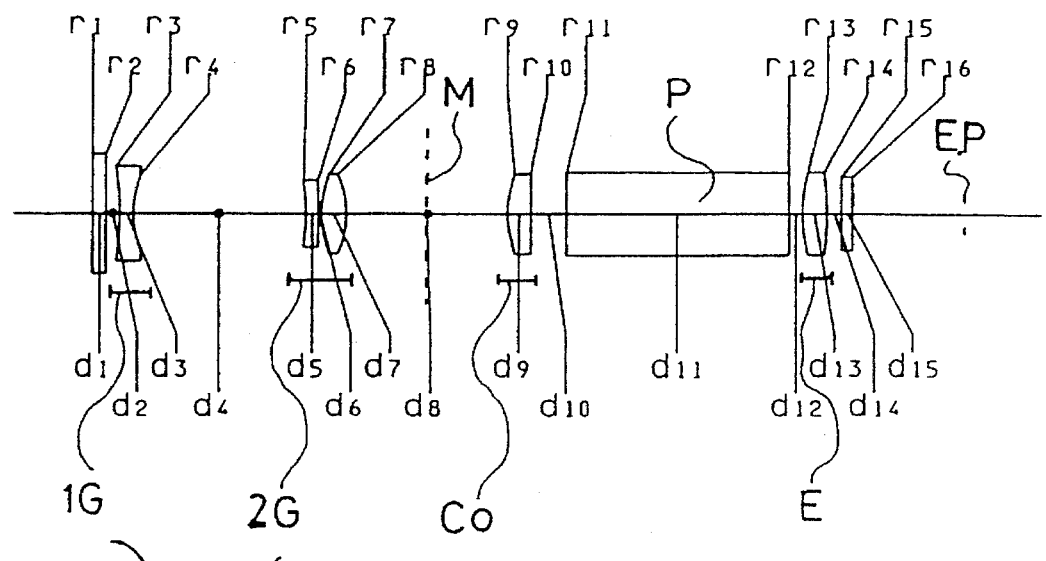
FIG. 9 is a schematic view of a lens arrangement of a real image type variable power finder at a wide-angle extremity, according to a third embodiment of the present invention.
Figure 10:
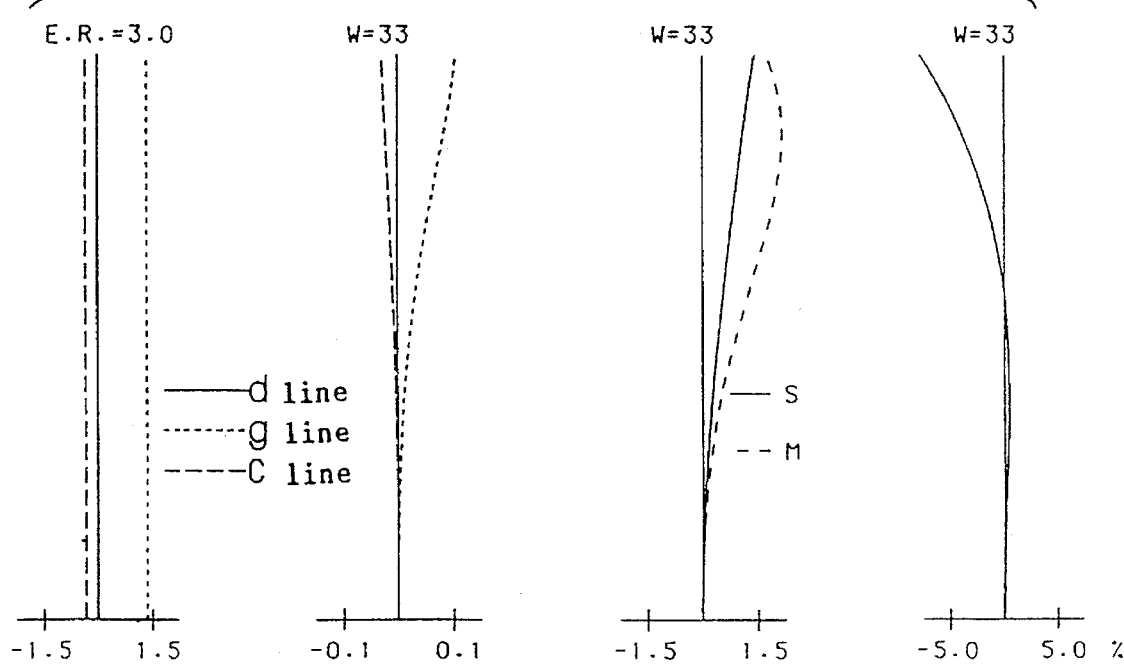
FIG. 10 shows various aberration diagrams of the lens system shown in FIG. 9.
Figure 11:
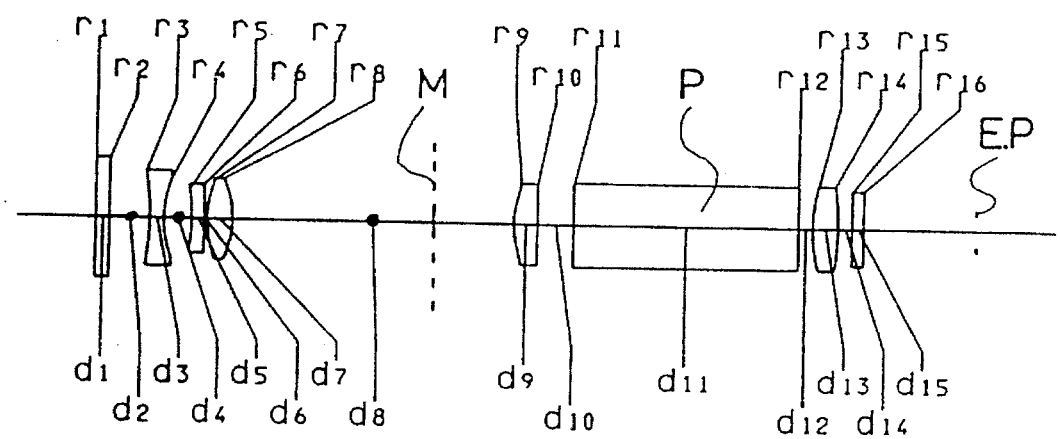
FIG. 11 is a schematic view of a lens arrangement of a real image type variable power finder at a telephoto extremity, according to the third embodiment of the present invention.
Figure 12:
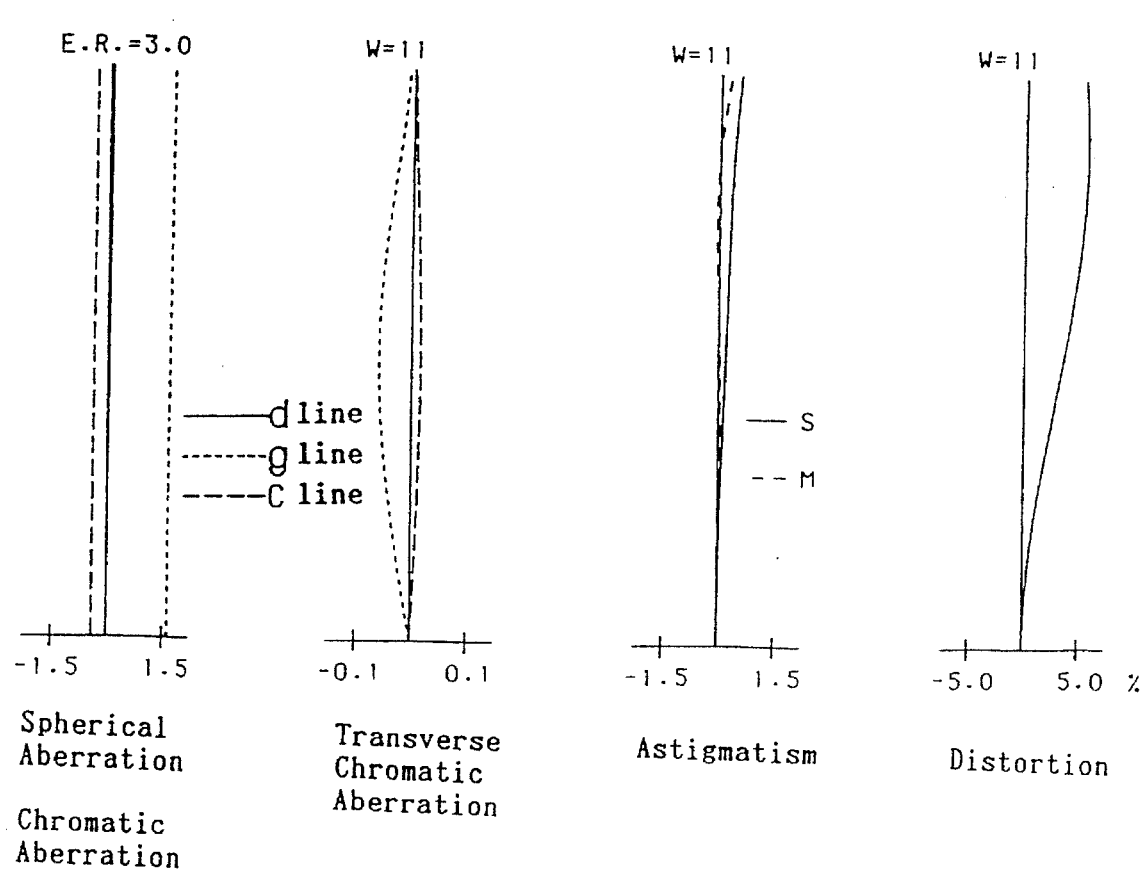
FIG. 12 shows various aberration diagrams of the lens system shown in FIG. 11.

FIGS. 9 through 12 show a third embodiment of a real image type variable power finder, according to the present invention. FIGS. 9 and 10 show a lens arrangement and diagrams of various aberrations thereof, at a wide-angle extremity, respectively. FIGS. 11 and 12 show a lens arrangement and diagrams of various aberrations thereof, at a telephoto extremity, respectively.

Numerical data of the lens system in the third embodiment are shown in Table 3 below.

TABLE 3

W = 33-17-11
Dp = -1.0
M = 0.31-0.59-0.91
E.R. = 3.0φ

| surface No. | R | D | $N^d$ | $v^d$ |
|---|---|---|---|---|
| 1 | ∞ | 1.50 | 1.49176 | 57.4 |
| 2 | ∞ | 1.50-6.62-4.22 | — | — |
| 3* | -35.481 | 1.50 | 1.49176 | 57.4 |
| 4* | 9.160 | 18.30-7.35-3.00 | — | — |
| 5* | -20.000 | 1.40 | 1.58547 | 29.9 |
| 6 | -89.337 | 0.30 | — | — |
| 7* | 9.570 | 2.70 | 1.49176 | 57.4 |
| 8* | -9.587 | 16.83-22.66-29.40 | — | — |
| 9* | 7.554 | 2.50 | 1.49176 | 57.4 |
| 10 | ∞ | 3.80 | — | — |
| 11 | ∞ | 23.50 | 1.49176 | 57.4 |
| 12 | ∞ | 1.50 | — | — |
| 13* | 15.852 | 2.60 | 1.49176 | 57.4 |
| 14 | -32.780 | 1.50 | — | — |
| 15 | ∞ | 1.20 | 1.49176 | 57.4 |
| 16 | ∞ | — | — | — |

*marked surface is aspherical.
NO. 3: K = 0.0, A4 = -0.10054 × $10^{-2}$, A6 = 0.77762 × $10^{-4}$, A8 = -0.22023 × $10^{-5}$, A10 = 0.22072 × $10^{-7}$, A12 = 0.0
NO. 4: K = 0.0, A4 = -0.15356 × $10^{-2}$, A6 = 0.95170 × $10^{-4}$, A8 = -0.21453 × $10^{-5}$, A10 = 0.0, A12 = 0.0
NO. 5: K = 0.0, A4 = -0.69525 × $10^{-4}$, A6 = -0.92680 × $10^{-6}$, A8 = 0.0, A10 = 0.0, A12 = 0.0
NO. 7: K = 0.0, A4 = -0.52379 × $10^{-3}$, A6 = 0.74559 × $10^{-6}$, A8 = 0.0, A10 = 0.0, A12 = 0.0
NO. 8: K = 0.0, A4 = 0.10753 × $10^{-3}$, A6 = -0.16566 × $10^{-5}$, A8 = 0.0, A10 = 0.0, A12 = 0.0
NO. 9: K = 0.0, A4 = -0.22543 × $10^{-2}$, A6 = 0.31721 × $10^{-4}$, A8 = 0.0, A10 = 0.0, A12 = 0.0
NO. 13: K = 0.0, A4 = -0.86738 × $10^{-4}$, A6 = -0.16640 × $10^{-7}$, A8 = -0.28199 × $10^{-9}$, A10 = 0.0, A12 = 0.0

Fourth Embodiment

Figure 13:
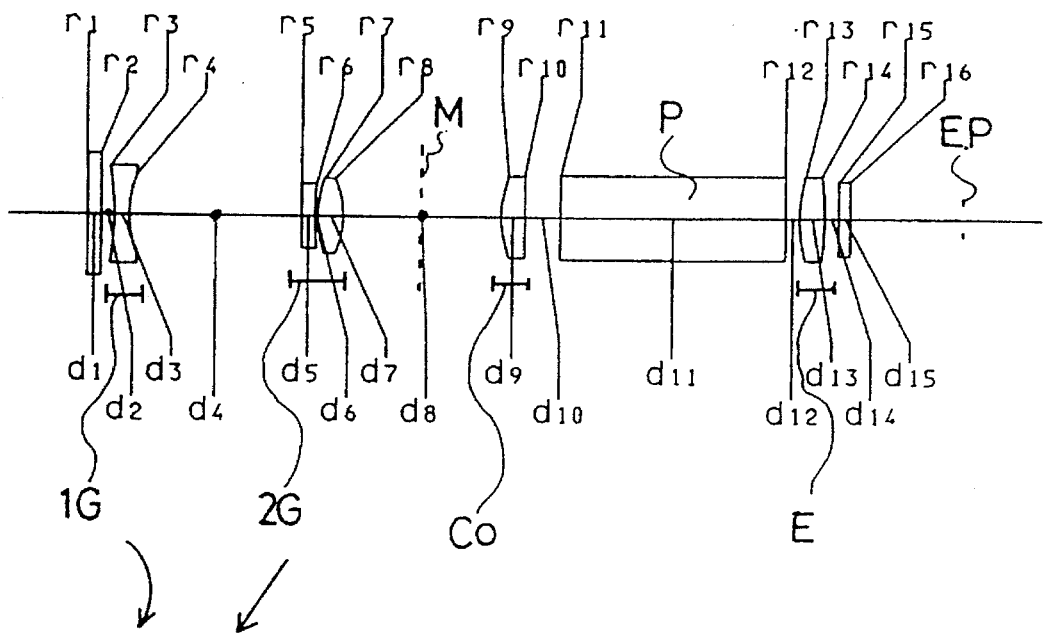
FIG. 13 is a schematic view of a lens arrangement of a real image type variable power finder at a wide-angle extremity, according to a fourth embodiment of the present invention.
Figure 14:
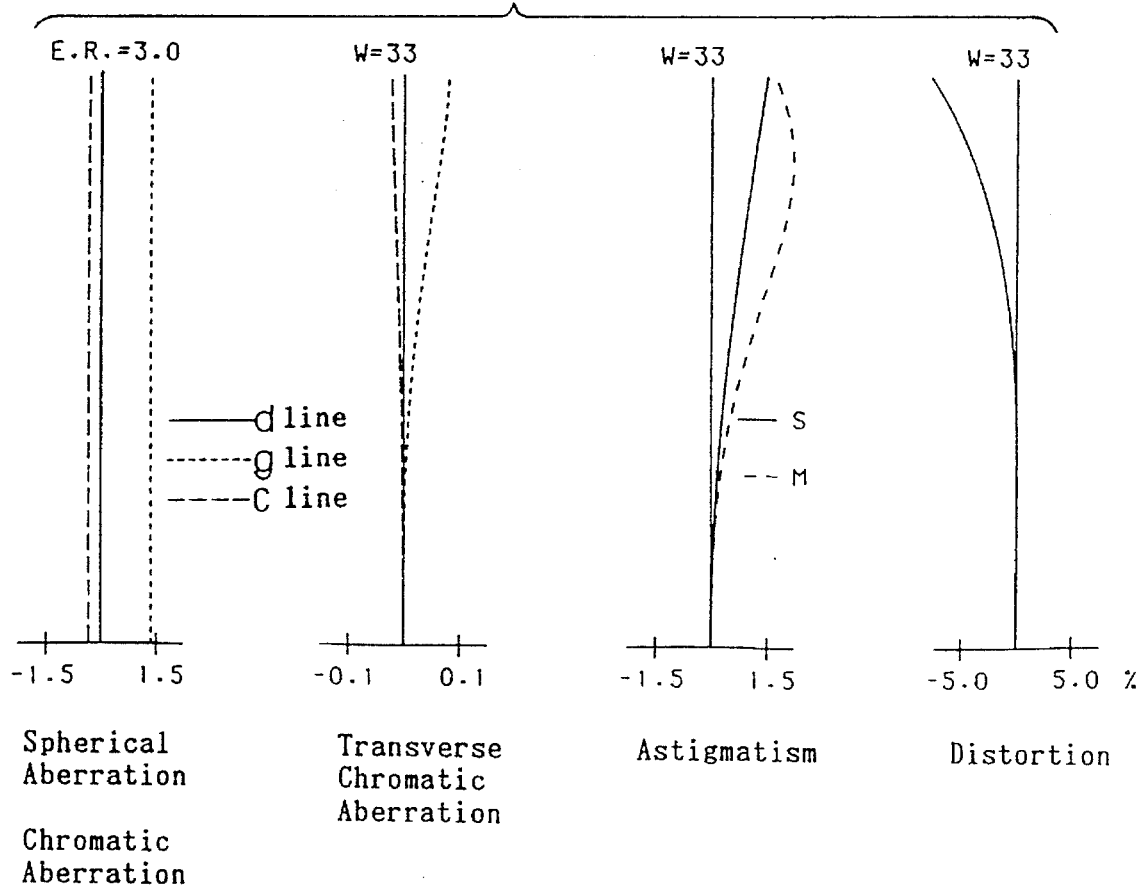
FIG. 14 shows various aberration diagrams of the lens system shown in FIG. 13.
Figure 15:
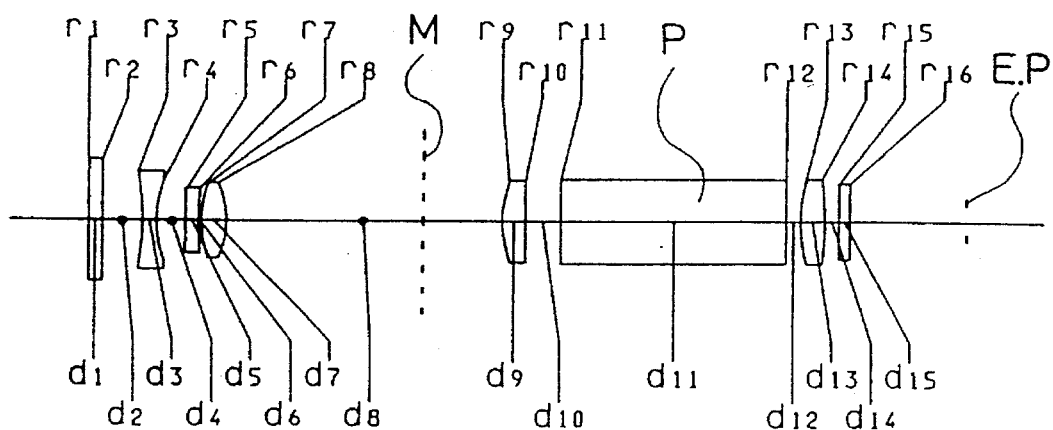
FIG. 15 is a schematic view of a lens arrangement of a real image type variable power finder at a telephoto extremity, according to the fourth embodiment of the present invention; and, FIG. 16 shows various aberration diagrams of the lens system shown in FIG. 15.
Figure 16:
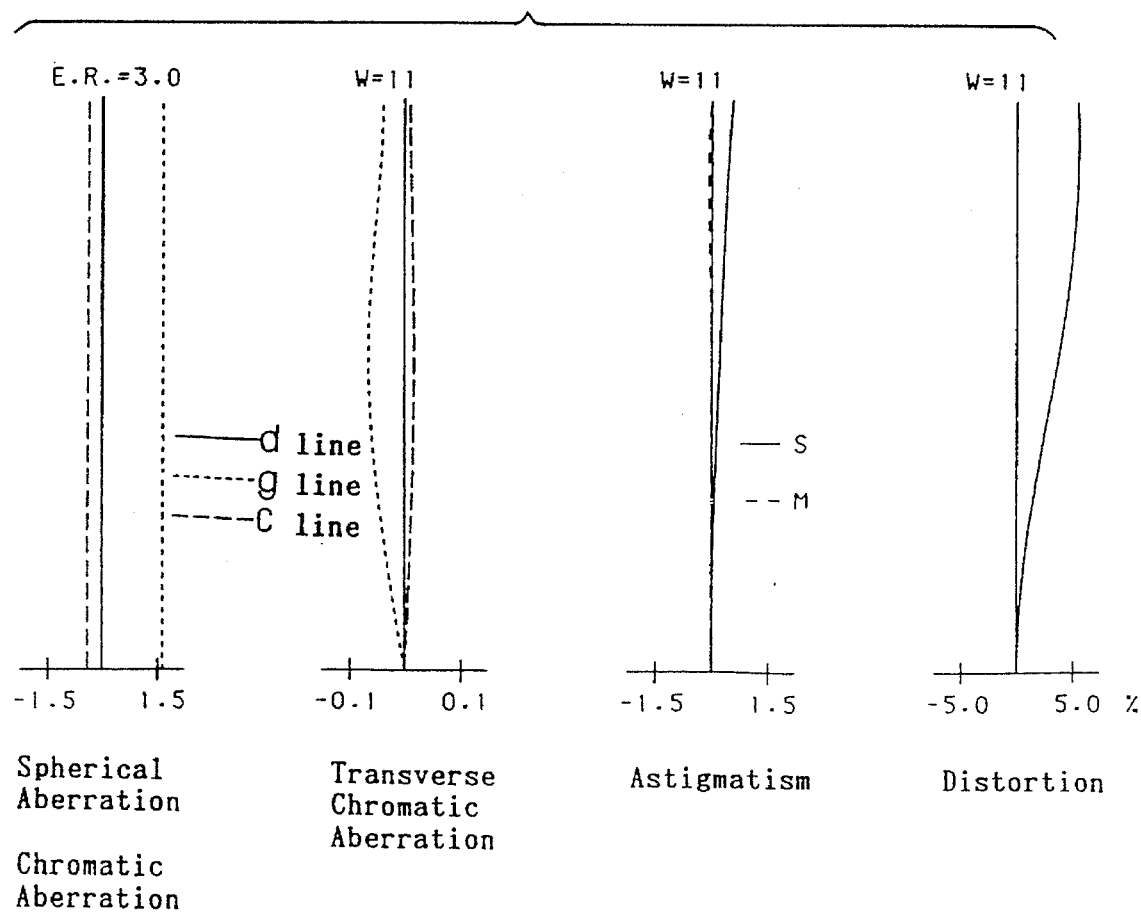

FIGS. 13 through 16 show a fourth embodiment of a real image type variable power finder, according to the present invention. FIGS. 13 and 14 show a lens arrangement and diagrams of various aberrations thereof, at a wide-angle extremity, respectively. FIGS. 15 and 16 show a lens arrangement and diagrams of various aberrations thereof, at a telephoto extremity, respectively.

Numerical data of the lens system in the fourth embodiment are shown in Table 4 below.

TABLE 4

W = 33-17-11
Dp = -1.0
M = 0.32-0.60-0.92
E.R. = 3.0φ

| surface No. | R | D | $N^d$ | $v^d$ |
|---|---|---|---|---|
| 1 | ∞ | 1.50 | 1.49176 | 57.4 |
| 2 | ∞ | 1.50-6.68-4.36 | — | — |
| 3* | -27.251 | 1.50 | 1.49176 | 57.4 |
| 4* | 10.085 | 18.30-7.29-3.00 | — | — |
| 5* | 286.788 | 1.40 | 1.58547 | 29.9 |
| 6 | 29.238 | 0.30 | — | — |
| 7* | 10.259 | 2.70 | 1.49176 | 57.4 |
| 8* | -9.182 | 16.37-22.20-28.80 | — | — |
| 9* | 7.659 | 2.50 | 1.49176 | 57.4 |
| 10 | ∞ | 3.80 | — | — |
| 11 | ∞ | 23.50 | 1.49176 | 57.4 |
| 12 | ∞ | 1.50 | — | — |
| 13* | 15.519 | 2.60 | 1.49176 | 57.4 |
| 14 | -34.217 | 1.50 | — | — |
| 15 | ∞ | 1.20 | 1.49176 | 57.4 |
| 16 | ∞ | — | — | — |

*marked surface is aspherical.
NO. 3: K = 0.0, A4 = -0.86855 × 10⁻³, A6 = 0.78515 × 10⁻⁴, A8 = -0.23317 × 10⁻⁵, A10 = 0.24057 × 10⁻⁷, A12 = 0.0
NO. 4: K = 0.0, A4 = -0.13256 × 10⁻², A6 = 0.96103 × 10⁻⁴, A8 = -0.22456 × 10⁻⁵, A10 = 0.0, A12 = 0.0
NO. 5: K = 0.0, A4 = -0.31794 × 10⁻³, A6 = -0.17211 × 10⁻⁵, A8 = 0.0, A10 = 0.0, A12 = 0.0
NO. 7: K = 0.0, A4 = -0.37141 × 10⁻³, A6 = 0.17480 × 10⁻⁷, A8 = 0.0, A10 = 0.0, A12 = 0.0
NO. 8: K = 0.0, A4 = -0.45817 × 10⁻⁴, A6 = -0.12539 × 10⁻⁵, A8 = 0.0, A10 = 0.0, A12 = 0.0
NO. 9: K = 0.0, A4 = -0.19389 × 10⁻², A6 = 0.25097 × 10⁻⁴, A8 = 0.0, A10 = 0.0, A12 = 0.0
NO. 13: K = 0.0, A4 = -0.85263 × 10⁻⁴, A6 = -0.10763 × 10⁻⁶, A8 = 0.15393 × 10⁻⁹, A10 = 0.0, A12 = 0.0

The values of formulae (1) through (8) in each embodiment are shown in Table 5 below.

TABLE 5

|  | Embodiment 1 | Embodiment 2 |
|---|---|---|
| formula(1) | 3.10 | 3.14 |
| formula(2) | -0.51 | -0.46 |
| formula(3) | 0.55 | 0.53 |
| formula(4) | -0.19 | -0.08 |
| formula(5) | 0.020 | 0.027 |
| formula(6) | 0.79 | 0.57 |
| formula(7) | -0.30 | -0.60 |
| formula(8) | 27.50 | 27.50 |

|  | Embodiment 3 | Embodiment 4 |
|---|---|---|
| formula(1) | 3.20 | 3.17 |
| formula(2) | -0.47 | -0.47 |
| formula(3) | 0.56 | 0.56 |
| formula(4) | -0.16 | -0.12 |
| formula(5) | 0.013 | 0.016 |
| formula(6) | 0.76 | 0.69 |
| formula(7) | -0.26 | -0.37 |
| formula(8) | 27.50 | 27.50 |

As can be seen from Table 5 above, all four of the embodiments satisfy the requirements defined by formulae (1) through (8). Moreover, in a real image type variable power finder according to the present invention, the aberrations can be effectively corrected at both the small and large magnifying powers.

As may be understood from the above discussion, according to the present invention, a real image type of small variable power finder having a half angle of view greater than 30° at a wide-angle extremity and a high zoom ratio approximately 3 can be obtained.

We claim:

1. A real image type variable power finder comprising:

an objective lens system, a condenser lens and an ocular lens system, arranged in this order from an object side;

an image erecting optical system;

said objective lens system comprising a first lens group having a negative power and a second lens group having a positive power in this order from the object side, so that said first and second lens groups can be moved to vary a magnification;

said second lens group comprising a negative lens and a positive lens in this order from the object side; and, said variable power finder satisfies the following relationships:

$$2.5 < f_E/f_S < 4.0$$

$$-0.7 < f_S/f_1 < -0.3 \ (f_1 < 0)$$

$$0.4 < f_S/f_2 < 0.8$$

$$-0.3 < f_S/f_{2-1} < -0.05 \ (f_{2-1} < 0)$$

wherein $f_E$ designates a focal length of said ocular lens system;

$f_S$ designates an effective focal length of a lens system including said objective lens system and said condenser lens at a wide angle extremity;

$f_1$ designates a focal length of said first lens group of said objective lens system;

$f_2$ designates a focal length of said second lens group of said objective lens system;

$f_{2-1}$ designates a focal length of said negative lens of said second lens group of said objective lens system.

2. A real image type variable power finder according to claim 1, wherein said first lens group of said objective lens system includes a single negative double-concave aspherical lens and satisfies the following relationships:

$$0.005 < (\Delta X_1 - \Delta X_2)/f_S$$

$$0.3 < f_S/r_{1-2} < 0.9$$

$$-0.65 < r_{1-2}/r_{1-1} < -0.15 \ (r_{1-1} < 0)$$

wherein $\Delta X_1$ designates an amount of aspherical deviation of a first surface of said double-concave lens at a maximum effective diameter thereof;

$\Delta X_2$ designates an amount of aspherical deviation of a second surface of said double-concave lens at said maximum effective diameter thereof;

$r_{1-1}$ designates a paraxial radius of curvature of said first surface of said double-concave lens;

$r_{1-2}$ designates a paraxial radius of curvature of said second surface of said double-concave lens.

3. A real image type variable power finder according to claim 1, wherein said second lens group of said objective lens system satisfies the following relationship:

$$15 < v_{2P} - v_{2N}$$

wherein $\nu_{2P}$ designates an Abbe number of a d-line of said positive lens of said second lens group;

$\nu_{2N}$ designates an Abbe number of a d-line of said negative lens of said second lens group.

4. A real image type variable power finder according to claim 1, further comprising a field curvature correcting lens having a positive focal length, said field curvature correcting lens being provided between said objective lens system and said condenser lens.

5. A real image type variable power finder according to claim 4, wherein said field curvature correcting lens is provided with at least one aspherical surface.

6. A real image type variable power finder according to claim 4, wherein said image erecting optical system has four reflecting surfaces to invert an object image to be formed by said objective lens system, one of said four reflecting surfaces being located between said objective lens system and said field curvature correcting lens.

7. A real image type variable power finder according to claim 1, wherein said image erecting optical system includes four reflecting surfaces to invert an object image formed by said objective lens system, and at least one of said four reflecting surfaces being located between said objective lens system and said condenser lens.

8. A real image type variable power finder according to claim 1, wherein said image erecting optical system comprises a mirror and a prism, and wherein said mirror is disposed between said objective lens system and said condenser lens, and wherein said prism is disposed between said condenser lens and said ocular lens system.

* * * * *

UNITED STATES PATENT AND TRADEMARK OFFICE
CERTIFICATE OF CORRECTION

PATENT NO. : 5,513,043
DATED : April 30, 1996
INVENTOR(S) : T. ABE et al.

It is certified that error appears in the above-indentified patent and that said Letters Patent is hereby corrected as shown below:

On the title page, in section [73], "Assignee", line 1, after "Kogyo" insert ---Kabushiki---.

Signed and Sealed this

First Day of October, 1996

Attest:

BRUCE LEHMAN

Attesting Officer     Commissioner of Patents and Trademarks